Oct. 3, 1933.                R. H. CUNNINGHAM                1,929,351
                                  TOOL
                            Filed June 5, 1931
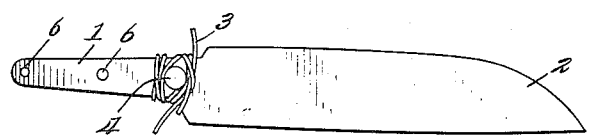
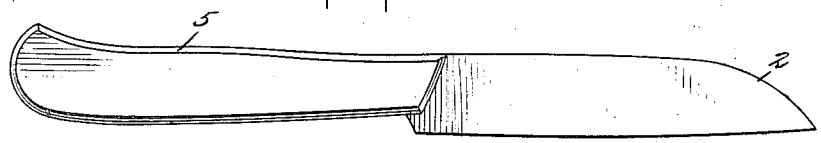
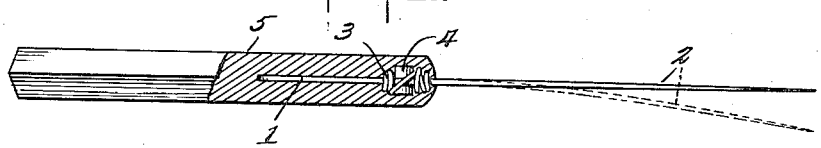
INVENTOR
ROY H. CUNNINGHAM
by his attorneys
Howson and Howson Patented Oct. 3, 1933

1,929,351

UNITED STATES PATENT OFFICE 1,929,351

TOOL

Roy H. Cunningham, Fairfield, Conn., assignor to The Bryant Electric Company, Bridgeport, Conn., a corporation of Connecticut Application June 5, 1931. Serial No. 542,388

6 Claims. (Cl. 30—9)

This invention relates to tools or instruments and more particularly to tools or instruments having handles molded of plastic molding compositions and it is an object of this invention to provide an improved tool or instrument in which the handle will not crack or break away from the tang and it is also an object of this invention to provide an improved method of manufacturing tools or instruments of the type described.

In the drawing—

Figure 1 is a view in elevation of a tool portion shown ready for the application of the handle;

Figure 2 is a similar view of a tool or instrument complete; and

Figure 3 is a view partly in section and partly in elevation of the tool shown in Figure 1, the tool having been turned 90°.

The desirable qualities of the plastic molding compositions such as the phenolic condensation compounds and the method of their use has indicated these compositions as being especially suitable as materials for use in forming handles for tools or instruments, but for a number of tools, such as knives, the plastic molding compositions have not given satisfactory service owing to the breaking or cracking of the material of the handle adjacent the junction of the tang and the tool portion or the blade in a knife. Such cracking or breaking may be due to the lack of elasticity in the composition when cured and set which prevents yielding of the material of the handle when the tool or blade is deflected as indicated by the dotted line position of the blade shown in Figure 3.

To provide a handle in accordance with this invention, the tang 1 of the tool, shown in the drawing as a knife having a blade 2, is wrapped with several turns of a tape, string or other suitable wrapping of absorbent material 3 which has been impregnated with a solution of a plastic molding composition and which composition may be a composition other than that of which the handle is to be formed. The wrapping 3 is applied to the tang 1 adjacent the junction of the tang with the blade 2 and where projections, as rivet 4, are provided on the tang 1 to aid in anchoring the tang 1 in the handle 5, the wrapping extends about the projections, as shown in Figures 1 and 3. The preferred size of the wrapping 3 and the number of turns taken about the tang 1 may be varied with the size and nature of the tool. The handle 5 is then molded about the tang 1 under heat and pressure in the usual way of molding these compositions. Openings 6 may be left in the tang either for the purpose of inserting rivets to aid in securing the handle 5 to the tang 1 or for permitting the material of which the handle is formed to unite therethrough and form a bond tying together the portions of the handle on opposite sides of the tang.

While the manner in which the wrapping functions to prevent breakage of the handle is not understood, the wrapping may be embedded in the handle and serve as a bond and strengthen or reinforce the material of the handle or it may serve as a cushion reducing the effect of the tang and providing a resiliency needed at this point.

While the drawing illustrates the invention as used in the manufacture of a knife it is to be understood the invention is not to be limited to such application as it may be used in the manufacture of other tools or instruments.

What is claimed is:

1. An article of manufacture comprising a tool portion having a tang, coils of absorbent material surrounding said tang and a handle of molded material on said tang and absorbent material.

2. An article of manufacture comprising a tool portion having a tang, projections on said tang, a length of absorbent material on said tang and projections and a handle of a molded material on said tang and absorbent material.

3. An article of manufacture comprising a tool portion having a tang, fibrous absorbent material forming a wrapping on said tang adjacent the tool end thereof, and a handle of a molded material on said tang and bonded with said absorbent material.

4. An article of manufacture comprising a tool portion having a tang, a wrapping of a fibrous absorbent material on said tang, said wrapping having an uneven outer surface, and a handle of a molded material on said tang and bonded to said wrapping.

5. An article of manufacture comprising a tool portion having a tang, impregnated absorbent material on said tang and a handle of a molded material on said tang and absorbent material and bonded with the material impregnating said absorbent material.

6. An article of manufacture comprising a tool portion having a tang, a length of impregnated absorbent material surrounding said tang adjacent the tool end thereof and a handle of a molded material on said tang and absorbent material and bonded with the material impregnating said absorbent material.

ROY H. CUNNINGHAM.